S. E. & W. W. MORRAL.
MACHINE FOR REMOVING THE BUTT ENDS OF EARS OF CORN.
APPLICATION FILED FEB. 24, 1908.
907,849.
Patented Dec. 29, 1908.
6 SHEETS—SHEET 1.
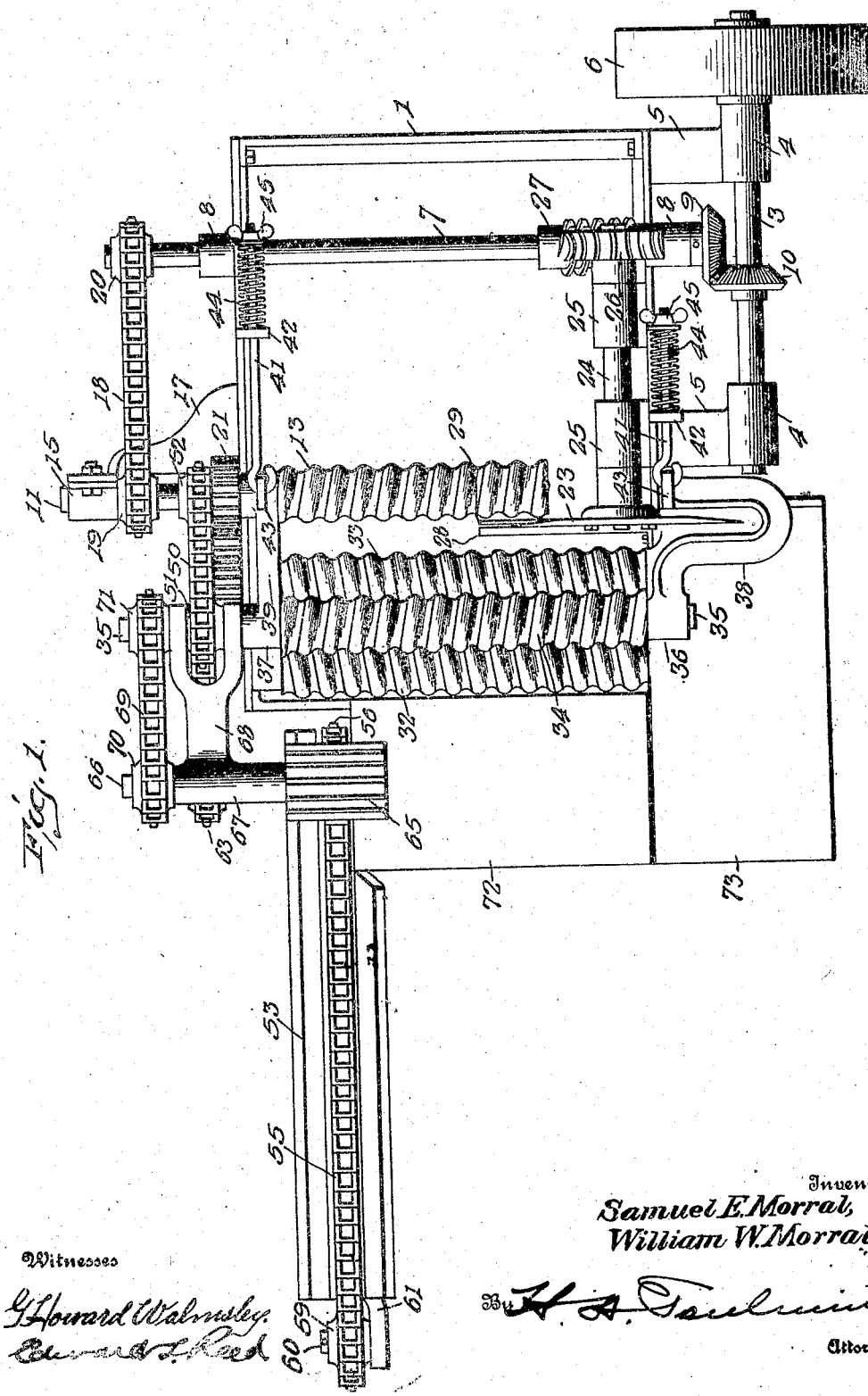
Witnesses
G. Howard Walmsley
Edward T. Reed
Inventors
Samuel E. Morral,
William W. Morral,
By H. A. Toulmin
Attorney

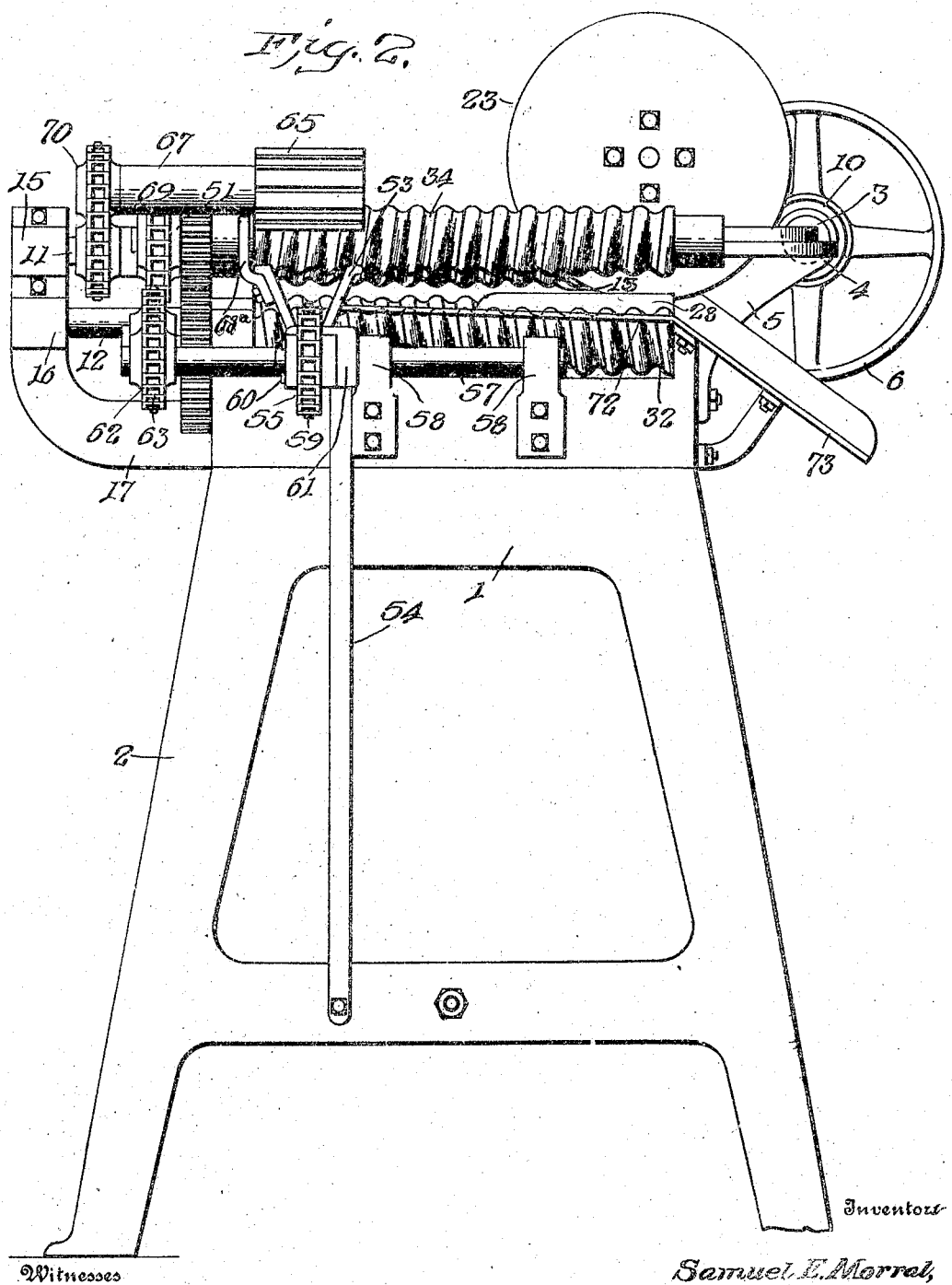

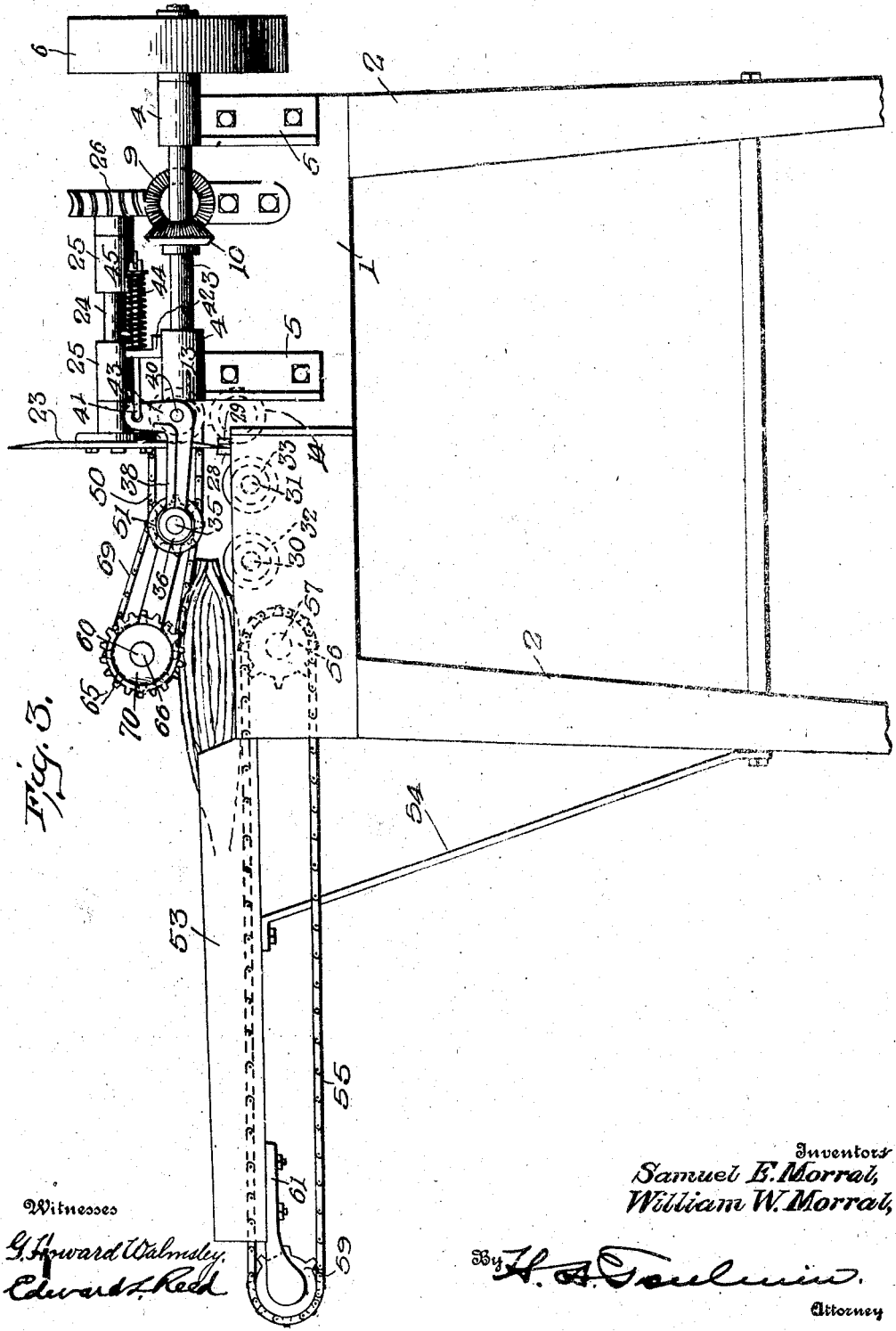

S. E. & W. W. MORRAL.
MACHINE FOR REMOVING THE BUTT ENDS OF EARS OF CORN.
APPLICATION FILED FEB. 24, 1908.
907,849.
Patented Dec. 29, 1908.
6 SHEETS—SHEET 4.
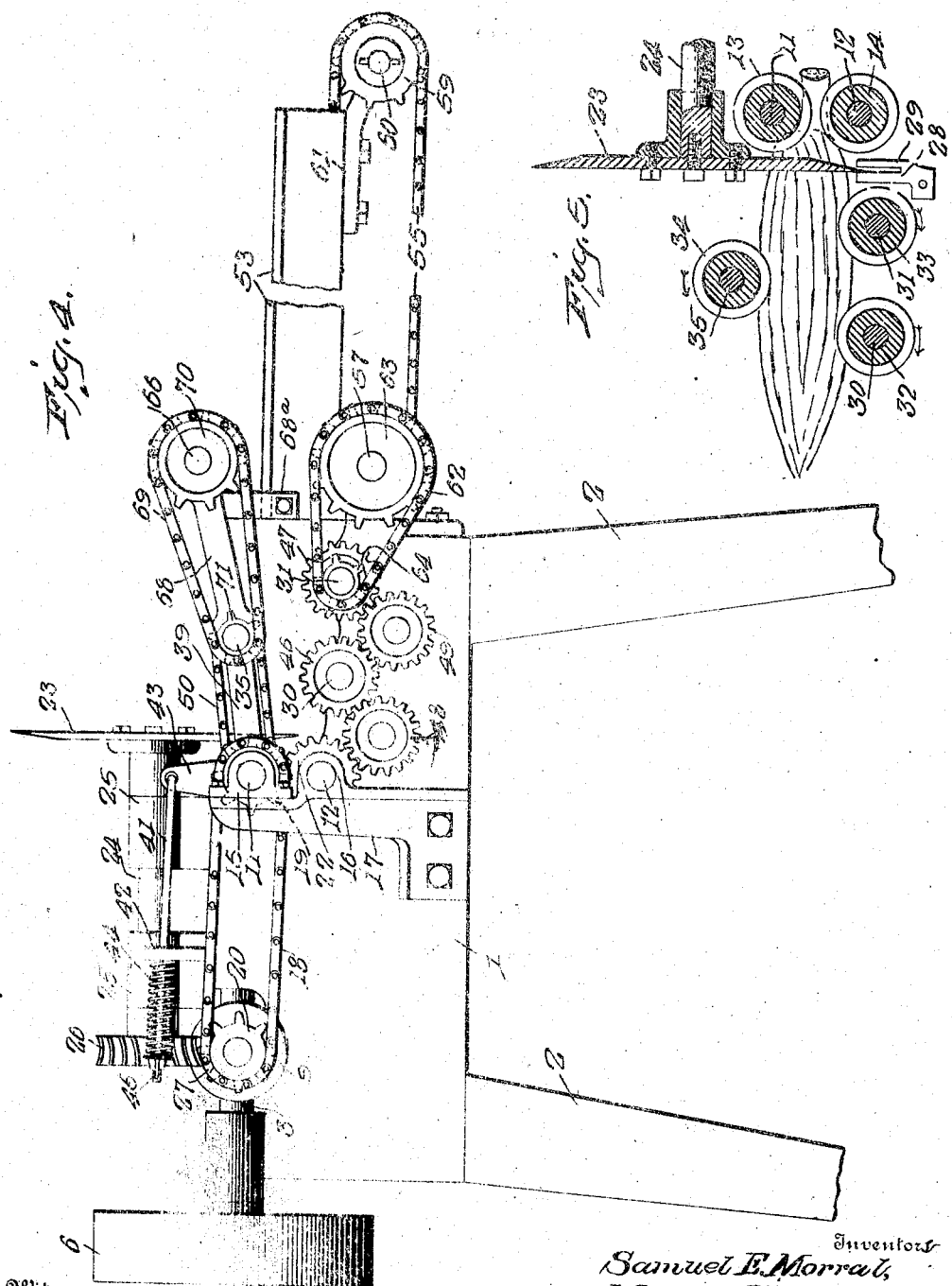
Witnesses
G. Howard Walmsley
Edward Reed
Inventors
Samuel E. Morral,
William W. Morral,
By H. A. Toulmin,
Attorney

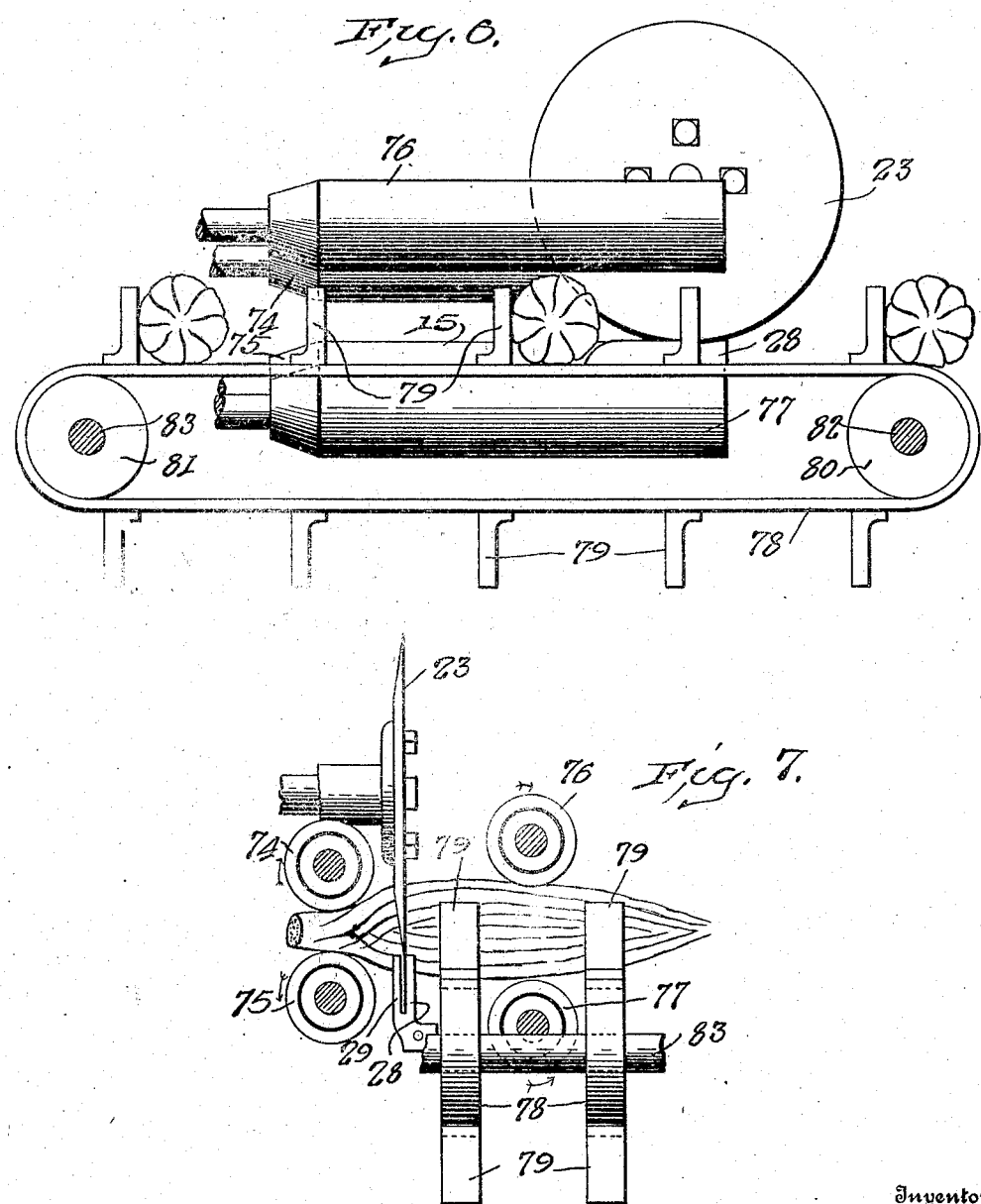

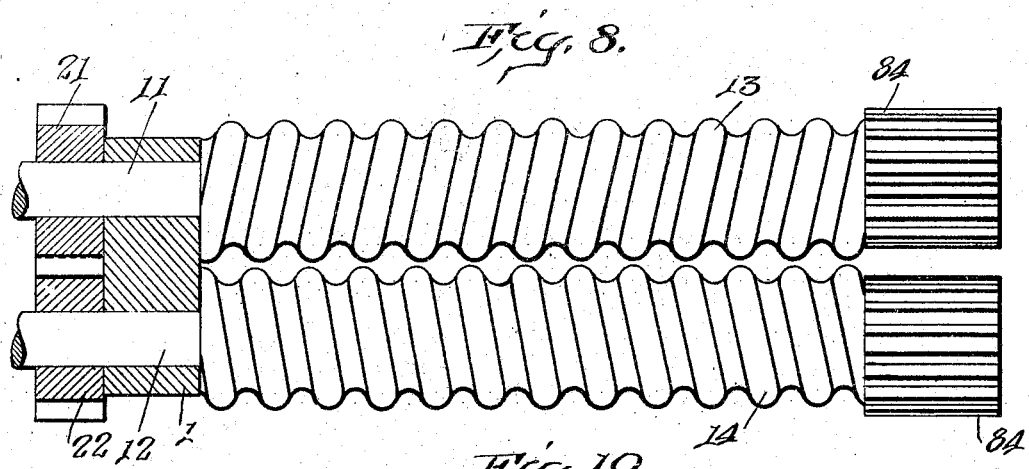
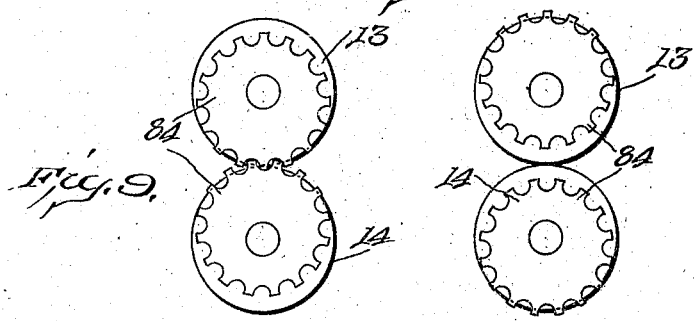
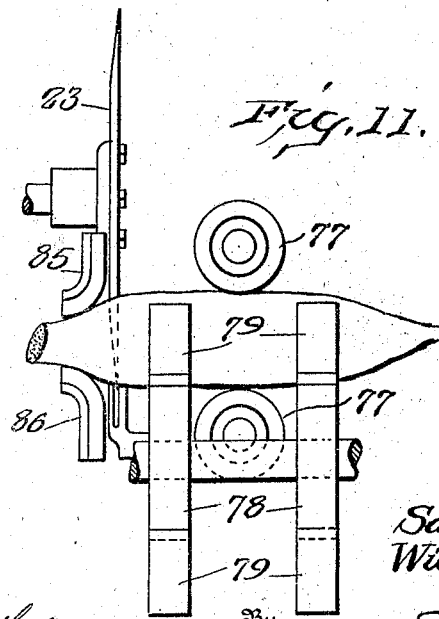

UNITED STATES PATENT OFFICE.

SAMUEL E. MORRAL AND WILLIAM W. MORRAL, OF MORRAL, OHIO.

MACHINE FOR REMOVING THE BUTT-ENDS OF EARS OF CORN.

No. 907,849.     Specification of Letters Patent.     Patented Dec. 29, 1908.

Application filed February 24, 1908. Serial No. 417,312.

REISSUED

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Machines for Removing the Butt-Ends of Ears of Corn, of which the following is a specification, reference being had therein to the accompanying drawings.

This invention relates to machines for removing the butt-ends of ears of corn and is designed more particularly for operating upon green corn, such as is used in canning factories.

The present invention is in the nature of an improvement upon Patent No. 801,258, granted to us October 10, 1905, and the object of the same is to provide a machine of this character with a high degree of efficiency, both as to the character of the work done and as to the speed with which the ears of corn are handled.

With this object in view our invention consists in certain novel features of construction and in certain parts and combinations hereinafter to be described, and then more particularly pointed out in the claims.

In the accompanying drawings, Figure 1 is a top plan view of a machine embodying our invention; Fig. 2 is an end elevation of the same; Fig. 3 is a side elevation thereof; Fig. 4 is an elevation of the side opposite that shown in Fig. 3; Fig. 5 is a detail sectional view of the cutting mechanism, together with the gaging and feeding rollers; Fig. 6 is an elevation of a portion of the machine, showing a modified form of gaging and feeding rollers with additional means for conveying ears of corn longitudinally thereof; Fig. 7 is an end elevation of what is shown in Fig. 6; Fig. 8 is a detail view of a modified form of gaging rollers; Figs. 9 and 10 are end views of the gaging rollers shown in Fig. 8; and Fig. 11 is a detail view showing a modified form of the guide.

In these drawings, we have illustrated the preferred form of our invention and have shown the same as comprising a main frame 1, preferably substantially rectangular in shape and mounted upon suitable standards or supports 2. A drive shaft 3 extends longitudinally of this frame and is mounted in suitable bearings 4 carried by brackets 5 which are secured to the side of the frame 1. This shaft may be rotated by any suitable means and is here shown as provided with a driving pulley 6 on the outer end thereof. A second shaft 7 extends transversely of the frame 1 and is mounted in suitable bearings 8 carried on the opposite sides of said frame. This shaft is provided on the end adjacent to the shaft 3 with a beveled pinion 9 adapted to mesh with a similar pinion 10 carried by said shaft 3.

Mounted in the main frame 1 and extending transversely thereof are suitable guides, such as gaging rollers, having their adjacent sides spaced apart a distance sufficient to admit the stem or tapered portion of the butt-end of the ear of corn, but not sufficient to permit the passage of the ear of corn, thus limiting the movement of the ear of corn longitudinally of the main frame and causing the same to be presented to the cutter in the proper position. In the form here shown these gaging rollers comprise a pair of parallel shafts 11 and 12, arranged in substantially the same vertical plane, journaled in one of the side members of the main frame and extending inwardly therefrom to a point near the opposite side member.

Mounted on or secured to the shafts 11 and 12 are suitable feed screws 13 and 14 having right and left hand threads, respectively, adapted to be rotated in opposite directions, whereby those portions of the threads on the adjacent sides of the two gaging rollers move in the same direction and tend to carry the ear of corn, the end of which is in engagement therewith, longitudinally of said rollers.

The gaging rollers may be rotated in opposite directions in any suitable manner, but we have here shown the shafts 11 and 12 as extending for some distance beyond the outer side of the main frame 1 and having their outer ends supported in suitable bearings 15 and 16 formed in a bracket 17 secured to the side of the main frame 1. The upper shaft 11 is here shown as rotated by a sprocket chain 18 which extends about a sprocket wheel 19, secured to the outer end of the shaft 11, and a similar sprocket wheel 20, secured to the corresponding end of the shaft 7. A pinion 21, mounted on the shaft 11, meshes with a corresponding pinion 22 carried by the shaft 12 and serves to rotate the shaft 12 at a uniform speed with the shaft 11, but in the opposite direction.

A suitable butt-removing device is mounted near the free or discharge ends of the gaging rollers and is adapted to engage the ears of corn as the same are fed longitudinally of said gaging rollers and remove the butt-ends thereof. This device is here shown as comprising a rotary disk 23, which is rigidly secured to one end of a shaft 24 which is journaled in suitable bearings 25 secured to the side member of the frame 1 and provided near the end opposite that to which the cutting disk 23 is secured with a worm wheel 26 adapted to mesh with a worm 27 secured to the shaft 7, whereby a rotary movement is imparted to the disk 23. Suitable shearer bars 28 and 29 are supported from the side member of the frame 1 beneath the cutter disk 23 and coöperate therewith. These shearer bars, which are preferably two in number, are supported on opposite sides of the cutter disk and support both the body and the butt of the ear during the cutting operation, thereby enabling the cutter to make a clean smooth cut. The cutter disk 23 preferably extends some distance beyond the free or discharge end of the gaging rollers, whereby the ear of corn is engaged and the butts severed therefrom before the ear has passed the end of the gaging rollers.

Suitable means are provided for holding the ear of corn in engagement with the gaging rollers 13 and 14 and feeding the same longitudinally thereof while it is held in such engagement. This means preferably comprises a plurality of feeding rollers which engage the ear of corn between them and hold the end of the same against the gaging rollers while it is being conveyed longitudinally of said rollers by suitable means. As here shown, the feeding rollers comprise a pair of parallel shafts 30 and 31 journaled at their opposite ends in the side members of the frame 1 and lying in substantially the same horizontal plane, which horizontal plane is slightly lower than that in which the shaft 12 of the lower gaging roller is located. Formed on or secured to the shafts 30 and 31 are feed screws 32 and 33 having their threads turned in the same direction and in a direction corresponding to that of the lower gaging roller 14. A vertically movable feeding roller 34 is mounted above the feeding rollers 32 and 33 and preferably in a vertical plane lying between the vertical planes of the axes of said feeding rollers. This feeding roller preferably comprises a shaft 35 journaled in bearings 36 and 37 formed in the ends of arms 38 and 39, which are pivotally supported on the main frame, the arm 38 being mounted on a suitable stud shaft or pivot pin 40 secured to the side of the main frame 1, and the arm 39 journaled on the shaft 11 of the upper gaging roller 13. The feed screw 34 is mounted on or secured to the shaft 35 between the bearings 36 and 37 and has its thread turned in a direction opposite to that in which the threads of the lower feeding rollers 32 and 33 are turned and corresponding to the direction in which the thread of the upper gaging roller 13 is turned. We also prefer to provide suitable means for holding the upper roller 34 in its proper position. These means are here shown as comprising rods 41 extending through suitable guides 42 carried by the main frame and secured at one end to upwardly extending lugs or arms 43 carried by the arms 38 and 39. Springs 44 are coiled about that end of the rod 41 lying beyond the apertured lug 42 and are confined between said apertured lugs and a suitable stop on the outer end of the rod, such as a thumb nut 45. The tension of these springs is such as to counterbalance the upper feeding roller 34 and permit the same to engage the ears of corn without exerting too great a pressure thereon.

The feeding rollers may be rotated in any suitable manner. In the present instance, we have shown the shafts 30 and 31 of the rollers 32 and 33 as provided with gears 46 and 47, the gear 46 being actuated from the gear 22 on the shaft 12 by means of an intermediate gear 48, while the gear 47 is actuated from the gear 46 by means of an intermediate gear 49, the relation of the several gears being such as to cause the lower feeding rollers 32 and 33 and the lower gaging roller 14 to be rotated in the same direction at a uniform rate of speed. The upper feeding roller 34 is preferably rotated by means of a sprocket chain 50 extending about a sprocket wheel 51 secured to the shaft 35 and a similar sprocket wheel 52 secured to the shaft 11 of the upper gaging roller 13, thus causing the upper feeding roller 34 and the upper gaging roller 14 to be rotated in the same direction and at a uniform rate of speed.

A feed trough 53 extends at substantially right angles to the feeding rollers and is supported in a substantially horizontal position by means of a brace 54. A suitable conveyer belt extends longitudinally of the trough 53 and as here shown comprises a sprocket chain 55 extending about a sprocket wheel 56 located at one end of the trough 53 and mounted on a shaft 57 which is journaled in suitable bearings 58 secured to the main frame. At the opposite end of the trough 53 the sprocket chain 55 extends about a similar sprocket wheel 59 mounted on a suitable stud shaft 60 carried by a bracket 61, which is supported on the outer end of the trough 53. The shaft 57 preferably extends beyond the sprocket wheel 56 and is adapted to be rotated by means of a sprocket chain 62 extending about a sprocket wheel 63 secured to the outer end of said shaft and about a sprocket wheel 64 mounted on the outer end of the shaft 31 of one of the feeding rollers. A short corrugated feeding roller 65 extends transversely of the trough 53 near the inner end thereof and is capable of vertical movement, whereby the same is adapted to rest upon the ears of corn as they are fed longitudinally of the trough 53 by the feed belt and to accommodate itself to ears of corn of different size. The corrugated feed roller 65 is preferably mounted upon a shaft 66 journaled in a bearing 67 formed in the outer end of an arm 68, the opposite end of which is journaled upon the shaft 35 of the vertically movable feeding roller 34. A stop or bracket 68ª, mounted on the trough 53, extends upwardly to a point beneath the arm 68 and is adapted to engage said arm to limit its downward movement. The shaft 66 also receives its rotary movement from the shaft 35 by means of a sprocket chain 69 extending about similar sprocket wheels 70 and 71 mounted on the shafts 66 and 35, respectively.

In the operation of the machine as thus described, the ears of corn are placed in the feed trough 53 with their butt-ends foremost, and, as they are carried inwardly by the feeding belt 55, they are engaged by the corrugated feed roller 65 and forced between the lower feeding rollers 32 and 33 and the vertically movable upper roller 34, the direction of rotation of these rollers being such as to move the ear of corn transversely thereof and longitudinally of the frame 1 until the butt-end thereof comes into engagement with the gaging rollers 13 and 14, the feeding rollers 32 and 33 being located in a slightly lower plane than the lower gaging roller 14, thus permitting the stem or tapered portion of the butt to extend between the two gaging rollers. As stated, the gaging rollers 13 and 14 are spaced apart a distance sufficient to permit the stem or small end of the butt of the ear of corn to enter between the same, but the space between the rollers is not sufficient to permit the ear of corn itself to enter, and, as these rollers have no vertical movement, they form an efficient stop to prevent the further movement of the ear of corn in a direction transversely of the length of the several rollers. The feed screws on the feeding rollers serve to convey the ear of corn longitudinally thereof while it is being held in engagement with the gaging rollers, and the feeding screws on the gaging rollers, which are rotated in the same direction as the feeding rollers, facilitate this longitudinal movement of the ear of corn. As the ear approaches the discharge end of the rollers it comes into engagement with the cutter 23, which is so located relatively to the gaging rollers as to engage the ear at such a point as to sever the stem and butt-end of the ear of corn, thereby removing the butt-end of the ear and loosening the husks on the ear so that the same are readily removed by the husking machine to which the ear of corn is fed after it leaves the machine for cutting off the butt-end thereof. As the butt-end of the ear of corn is severed, it is discharged from the gaging rollers and drops downwardly through the frame where it may be disposed of in any suitable manner, the ear of corn itself being carried to the discharge end of the feeding rollers, where it is dropped upon a suitable table 72 provided with a downwardly inclined portion 73 which serves to discharge the ear of corn into a suitable receptacle or conveyer.

While we have shown and above described the gaging and feeding rollers as being provided with feed screws, it is obvious that a smooth roller could be employed for this purpose if suitable means are provided for feeding the ear longitudinally thereof, and, in Figs. 6 and 7 of the drawings, we have shown a mechanism adapted to accomplish this result. In these figures we have shown gaging rollers 74 and 75 as comprising smooth rollers adapted to be rotated in the same manner as the rollers 13 and 14 are rotated and having the cutter 23 and shearer bars 28 and 29 located in the same relation thereto. The feeding rollers comprise two smooth rollers 76 and 77, located one above the other in a substantially vertical plane and adapted to receive the ear of corn from the feed trough and to hold the same with its butt-end in engagement with the gaging rollers 74 and 75. A suitable conveyer is provided for moving the ears of corn longitudinally of the feeding and gaging rollers and into engagement with the cutter. This conveyer preferably comprises a pair of endless belts 78 located on opposite sides of the feeding rollers 76 and 77 and provided with fingers or plates 79 adapted to engage the ears of corn on the opposite sides of the centers of said rollers and feed the same forward. These belts are preferably mounted on suitable drums 80 and 81, mounted on shafts 82 and 83, respectively, at opposite ends of the rollers, which shafts may be operated from the driving mechanism of the machine in any suitable manner. The construction and operation of the modified form of the machine, with the exception of the changes above described, are the same as that of the machine first described, with the exception that the corn is fed directly to the conveyer 78 and the feed trough 53 dispensed with.

It will further be apparent that various means may be employed for removing the butt-ends of the ears, and, in Figs. 8 to 10 of the drawings, we have illustrated another form of device for accomplishing this. As shown in these figures, the gaging rollers 13 and 14 are provided at their outer ends with snapping rollers, which, in the present instance, are corrugated rollers 84 eccentrically mounted on the ends of the gaging rollers and so arranged relatively to the spiral groove in said gaging rollers as to receive the end of the ear between the same when it is discharged from the gaging rollers, the continued revolution of the gaging rollers and the snapping rollers serving to pinch or snap off the butt-end of the ear. When the snapping rollers, or similar devices, are employed, the cutting mechanism 23 is dispensed with. Further, it will be apparent that the machine can be successfully operated without the use of gaging rollers, as it is possible to substitute some other form of guide therefor. In Fig. 11 of the drawings, we have shown one form of guide with which the machine will successfully operate. This guide is shown in connection with the smooth feeding rollers shown in Figs. 6 and 7 and comprises two fixed guides 85 and 86 mounted in substantially the same positions as were occupied by the gaging rollers 74 and 75. These guides are, however, stationary and are here shown in the form of metal plates extending parallel with the feeding rollers 76 and 77 and having their adjacent edges spaced some distance apart and preferably rounded or bent in such a manner as to cause the same to diverge toward the feeding rollers. These guides receive the end or butt of the ear between them and serve to limit the movement thereof transversely of the feeding rollers and to guide the ear into a proper cutting position relatively to the cutter disk 23 as the ear is moved longitudinally of the feeding rollers by means of the conveyer 78.

From the foregoing description it will be apparent that we have provided a machine of the character described, in which the ears of corn may be fed to the same horizontally and will be moved into proper position relatively to the cutter and will be positively held in that position and positively fed to the cutter, the construction and operation of the machine being such that the work is accurately performed, a uniform portion of the butt-end of each ear of corn being cut away; and further, that the machine is capable of being operated at a high rate of speed and the ears of corn fed to the same in rapid succession, thus providing a machine having a high degree of efficiency both in the character of the work performed and in the speed with which the ears of corn are handled.

While we have above described and shown several modifications of our machine, we wish it to be understood that we do not desire to be limited to the exact details of construction shown and described, for obvious modifications will occur to a person skilled in the art.

Having thus fully described our invention, what we claim as new and desire to secure by Letters Patent, is:

1. In a machine of the character described, the combination, with gaging rollers, and a cutter operatively supported near the discharge end thereof, of positively operated means for holding an ear of corn against said gaging rollers, and means for conveying said ear of corn along said gaging rollers and into engagement with said cutter.

2. In a machine of the character described, the combination, with gaging rollers, and a cutter operatively supported near the discharge end thereof, of rollers for holding an ear of corn against said gaging rollers, and means for conveying said ear of corn along said gaging rollers and into engagement with said cutter.

3. In a machine of the character described, the combination, with gaging rollers, and a cutter operatively supported near the discharge end thereof, of rollers for holding an ear of corn against said gaging rollers, and means carried by the last-mentioned rollers for conveying said ear of corn longitudinally thereof.

4. In a machine of the character described, the combination, with gaging rollers comprising a pair of oppositely rotating rollers mounted one above the other, and a cutter operatively supported near the discharge end of said rollers, of rollers mounted at one side of said gaging rollers and adapted to hold an ear of corn against the same, and means for conveying an ear of corn longitudinally of said rollers.

5. In a machine of the character described, the combination, with gaging rollers having right and left hand feeding screws, and a cutter operatively mounted near the discharge end thereof, of feeding rollers adapted to hold an ear of corn against said gaging rollers and to feed the same longitudinally thereof.

6. In a machine of the character described, the combination, with gaging rollers, and a cutter operatively mounted near the discharge end thereof, of feeding rollers for holding an ear of corn against said gaging rollers, provided with means for feeding the same longitudinally thereof and comprising a plurality of rollers, one of which rollers is movable relatively to another of said rollers.

7. In a machine of the character described, the combination, with gaging rollers having right and left hand feed screws, and a cutter operatively mounted near the discharge end thereof, of feeding rollers extending substantially parallel with said gaging rollers and having right and left hand feed screws, and means for rotating all of said rollers.

8. In a machine of the character described, the combination, with gaging rollers having right and left hand feed screws, and a cutter operatively supported near the discharge end thereof, of feeding rollers having right and left hand feed screws corresponding to the feed screws of said gaging rollers, one of said feeding rollers being movably mounted relatively to another of said rollers, and means for actuating said rollers.

9. In a machine of the character described, the combination, with gaging rollers located one above the other, and a cutter operatively supported near the discharge end thereof, of feeding rollers comprising a pair of rollers mounted in substantially the same horizontal plane, a third roller movably mounted above the first-mentioned feeding rollers and between the vertical planes of the axes thereof, means for rotating said rollers and means for moving an ear of corn longitudinally thereof.

10. In a machine of the character described, the combination, with gaging rollers mounted one above the other and having right and left hand feed screws, and a cutter operatively supported near the discharge end of said gaging rollers, of feeding rollers comprising a pair of rollers located substantially in the same horizontal plane, each having a feed screw corresponding to the feed screw of the lower gaging roller, a vertically movable roller mounted above said first-mentioned feeding rollers, between the vertical planes of the axes thereof and having a feed screw corresponding to the feed screw of the upper gaging roller, and means for rotating said rollers.

11. In a machine of the character described, the combination, with gaging rollers, and a cutter operatively supported near the discharge end thereof, of feeding rollers extending substantially parallel to said gaging rollers and adapted to hold an ear of corn in engagement with said gaging rollers, means for feeding said ear of corn longitudinally of said rollers, a feed trough extending at substantially right angles to said feeding rollers, and means for conveying an ear of corn longitudinally of said trough and into engagement with said feeding rollers.

12. In a machine of the character described, the combination, with gaging rollers, and a cutter operatively supported near the discharge end thereof, of feeding rollers extending substantially parallel to said gaging rollers and adapted to hold an ear of corn in engagement with said gaging rollers, means for feeding said ear of corn longitudinally of said rollers, a feed trough extending at substantially right angles to said feeding rollers, a conveyer moving longitudinally of said trough, and a positively rotated roller mounted above said feed trough and adapted to engage the ears of corn and move the same into engagement with said feeding rollers.

13. A machine of the character described comprising a guide, a butt-removing device near the discharge end of said guide, positively operating means for holding an ear of corn against said guide, and means for conveying said ear of corn along said guide and into engagement with said butt-removing device.

14. A machine of the character described comprising a guide, a butt-removing device near the discharge end of said guide, rollers for holding an ear of corn against said guide, and means for conveying an ear of corn longitudinally of said guide.

15. A machine of the character described comprising a guide, a butt-removing device near the discharge end of said guide, and feeding rollers for holding an ear of corn against said guide and provided with means for feeding the same longitudinally thereof.

16. A machine of the character described comprising gaging rollers, butt-removing means near the discharge end thereof, means for holding an ear of corn against said gaging rollers, and means for conveying said ear of corn longitudinally thereof.

17. A machine of the character described comprising gaging rollers, butt-removing means near the discharge end thereof, and feeding rollers for holding an ear of corn against said gaging rollers and provided with means for feeding the same longitudinally thereof.

18. A machine of the character described comprising a guide, a cutter operatively supported near the discharge end thereof, rollers for holding an ear of corn against said guide, means for conveying said ear of corn longitudinally thereof, and shearer bars supported near the lower edge of said cutter and on opposite sides thereof.

In testimony whereof, we affix our signatures in presence of two witnesses.

SAMUEL E. MORRAL.
WILLIAM W. MORRAL.

Witnesses:
ELZA F. McKEE,
EDWARD S. REED.